United States Patent
Saito et al.

(10) Patent No.: US 11,409,823 B2
(45) Date of Patent: Aug. 9, 2022

(54) INFORMATION PROCESSING APPARATUS, COATING MATERIAL GENERATOR, AND COMPUTER PROGRAM

(71) Applicant: SHISEIDO COMPANY, LTD., Tokyo (JP)

(72) Inventors: Naoki Saito, Tokyo (JP); Ryuta Okazaki, Tokyo (JP); Naomi Kitamura, Tokyo (JP); Kohei Matsumori, Tokyo (JP); Yuichiro Mori, Tokyo (JP)

(73) Assignee: Shiseido Company, Ltd., Tokyo (JP)

( * ) Notice: Subject to any disclaimer, the term of this patent is extended or adjusted under 35 U.S.C. 154(b) by 75 days.

(21) Appl. No.: 17/258,715

(22) PCT Filed: May 24, 2019

(86) PCT No.: PCT/JP2019/020595
§ 371 (c)(1),
(2) Date: Jan. 7, 2021

(87) PCT Pub. No.: WO2020/012788
PCT Pub. Date: Jan. 16, 2020

(65) Prior Publication Data
US 2021/0286854 A1    Sep. 16, 2021

(30) Foreign Application Priority Data
Jul. 9, 2018    (JP) .............................. JP2018-130080

(51) Int. Cl.
*G06F 16/95*    (2019.01)
*G06F 16/9535*  (2019.01)
(Continued)

(52) U.S. Cl.
CPC .... *G06F 16/9535* (2019.01); *G06F 16/24575* (2019.01); *G06F 21/6227* (2013.01); *G06F 2221/2141* (2013.01)

(58) Field of Classification Search
CPC ......................... G06F 16/9535; G06F 16/2575
See application file for complete search history.

(56) References Cited

U.S. PATENT DOCUMENTS 10,219,832 B2 *    3/2019    Bagwell ............ A61M 25/0084
10,729,623 B2 *    8/2020    Hayakawa ............ C08F 265/06
(Continued)

FOREIGN PATENT DOCUMENTS

JP    2001-357140 A    12/2001
JP    2003-186962 A    7/2003
(Continued)

OTHER PUBLICATIONS

International Search Report (with partial translation) and Written Opinion issued in corresponding International Patent Application No. PCT/JP2019/020595, dated Jun. 18, 2019.

*Primary Examiner* — Eliyah S. Harper
(74) *Attorney, Agent, or Firm* — Morgan, Lewis & Bockius LLP

(57) ABSTRACT

An information processing apparatus includes a means for storing coating material information on coating material, and tactile sensation information in which the tactile sensation when each coating material is applied to the skin is recorded, the coating material information and the tactile sensation information is associated with each other, a means for acquiring search criteria for at least one of tactile sensations and textures, identifying at least one tactile sensation information corresponding to the acquired search (Continued)

criteria, and a means for presenting the coating material information associated with the identified tactile sensation information.

19 Claims, 16 Drawing Sheets

(51) Int. Cl.
    *G06F 16/2457*     (2019.01)
    *G06F 21/62*     (2013.01)

(56) References Cited

U.S. PATENT DOCUMENTS

| | | | |
|---|---|---|---|
| 11,129,919 B2* | 9/2021 | Lindner | A61F 13/512 |
| 2005/0142093 A1* | 6/2005 | Skover | A61Q 19/08 |
| | | | 601/84 |
| 2011/0189440 A1* | 8/2011 | Appleby | B22C 9/10 |
| | | | 523/435 |
| 2014/0324118 A1* | 10/2014 | Simon | A61B 5/7267 |
| | | | 607/46 |
| 2016/0107133 A1* | 4/2016 | Sugino | G01N 21/25 |
| | | | 366/142 |

FOREIGN PATENT DOCUMENTS

| | | |
|---|---|---|
| JP | 2008-048989 A | 3/2008 |
| WO | 2013/042178 A1 | 3/2013 |
| WO | 2015/004903 A1 | 1/2015 |

\* cited by examiner

FIG. 3

| USER INFORMATION DATABASE | | | | |
|---|---|---|---|---|
| USER ID | USER NAME | USER ATTRIBUTE | | DEVICE ID |
| | | GENDAR | AGE | |
| U001 | U1 | FEMALE | 28 | MAC001 |
| U002 | U2 | MALE | 30 | MAC002 |
| . | . | . | . | . |

FIG. 4

| COATING MATERIAL MASTER DATABASE | | | | | | | | | | | |
|---|---|---|---|---|---|---|---|---|---|---|---|
| COATING MATERIAL ID | COATING MATERIAL NAME | TEXTURE | | | TACTILE SENSATION | | | | | COMPONENT | |
| | | SMOOTH | MOIST | · | VIBRATION | FRICTION | STICKINESS | HOTNESS | HARDNESS | COMPONENT NAME | CONTENT RATIO |
| PRO001 | PRO1 | 1 | 2 | · | 70 | 80 | 50 | 60 | 45 | COMP1 COMP2 | 50 50 |
| PRO002 | PRO2 | 3 | 2 | · | 60 | 65 | 89 | 78 | 60 | COMP1 COMP3 | 40 60 |
| · | · | · | · | · | · | · | · | · | · | · | · |

FIG. 5

| SEARCH HISTORY INFORMATION DATABASE (USER ID=U001) | | | |
|---|---|---|---|
| SEARCH HISTORY ID | DATE AND TIME | COATING MATERIAL ID | SEARCH CRITERIA |
| SEAHIS001 | 2018/7/1 10:00 | PRO1 PRO2 | TEXTURE=SMOOTH |
| SEAHIS002 | 2018/7/1 10:01 | PRO3 | TACTILE SENSATION=VIBRATION(80) |
| . | . | . | . |

FIG. 6

| CUSTOMIZED INFORMATION DATABASE (USER ID=U001) | | | | | | | | | | | |
|---|---|---|---|---|---|---|---|---|---|---|---|
| CUSTOM IZATION ID | ORIGINAL COATING MATERIAL ID | CUSTOMIZED TEXTURE | | . | CUSTOMIZED TACTILE SENSATION | | | | CUSTOMIZED COMPONENT | | ACCESS RIGHT |
| | | SMOO TH | MOIST | | VIBR ATIO N | FRIC TION | STICKI NESS | HOT NESS | HARD NESS | COMPO NENT NAME | CONTENT RATIO | |
| CUS001 | PRO001 | 1 | 2 | . | . | . | . | . | . | COMP1 COMP2 COMP4 | 40 40 20 | U002 U003 |
| CUS002 | PRO002 | 3 | 2 | . | . | . | . | . | . | COMP1 COMP3 | 30 70 | ALL USERS |
| . | . | . | . | . | . | . | . | . | . | . | | . |

FIG. 15A

COATING MATERIAL MASTER DATABASE
(SKIN CONDITION CODE:STA001)

| COATING MATERIAL ID | COATING MATERIAL NAME | TEXTURE | | ... | TACTILE SENSATION | | | | | COMPONENT | |
| --- | --- | --- | --- | --- | --- | --- | --- | --- | --- | --- | --- |
| | | SMOOTH | MOIST | | VIBRATION | FRICTION | STICKINESS | HOTNESS | HARDNESS | COMPONENT NAME | CONTENT RATIO |
| PRO001 | PRO1 | 1 | 2 | ... | 70 | 80 | 50 | 60 | 45 | COMP1 COMP2 | 50 50 |
| PRO002 | PRO2 | 3 | 2 | ... | 60 | 65 | 89 | 78 | 85 | COMP1 COMP3 | 40 60 |
| : | : | : | : | : | : | : | : | : | : | : | : |

FIG. 15B

COATING MATERIAL MASTER DATABASE
(APPLICATOR ID:ITEM001)

| COATING MATERIAL ID | COATING MATERIAL NAME | TEXTURE | | ... | TACTILE SENSATION | | | | | COMPONENT | |
| --- | --- | --- | --- | --- | --- | --- | --- | --- | --- | --- | --- |
| | | SMOOTH | MOIST | | VIBRATION | FRICTION | STICKINESS | HOTNESS | HARDNESS | COMPONENT NAME | CONTENT RATIO |
| PRO001 | PRO1 | 1 | 2 | ... | 70 | 80 | 50 | 60 | 45 | COMP1 COMP2 | 50 50 |
| PRO002 | PRO2 | 3 | 2 | ... | 60 | 65 | 89 | 78 | 85 | COMP1 COMP3 | 40 60 |
| : | : | : | : | : | : | : | : | : | : | : | : |

INFORMATION PROCESSING APPARATUS, COATING MATERIAL GENERATOR, AND COMPUTER PROGRAM

TECHNICAL FIELD

The present invention relates to an information processing apparatus, a coating material generator, and a computer program.

BACKGROUND ART

In recent years, with the spread of online shopping, the number of consumers who purchase coating material (for example, cosmetics) to be applied to a skin on the Internet is increasing.

Such consumers tend to acquire information on the coating material prior to purchase by entering various search criteria on a search website.

For example, Japanese Patent Application Laid-Open No. 2001-357140 discloses a search system for facilitating the acquisition of information on cosmetic compounding components.

The search system inputs parameters regarding the user (for example, skin condition, preferences, and allergies) to a host computer.

The host computer displays cosmetic component that is most suitable for the input parameter by referring to the database of the cosmetic component and the cosmetic recipe that is stored in advance.

SUMMARY OF INVENTION

Technical Problem

Consumers of coating material tend to make much account of not only the utility of the coating material but also the texture (hereinafter referred to as "tactile sensation") which the consumers feel when the coating material is applied.

The texture depends on the components of the cosmetic.

However, in the technique of JP-A-2001-357140, it is possible to display cosmetic compounding components suitable for consumers, but it is not possible to present cosmetics corresponding to the desired tactile sensation of consumers.

As such, consumers cannot specify cosmetics that gives the desired tactile sensation.

As described above, conventionally, it is not possible to present to the user the coating material information on the coating material that gives a desired tactile sensation.

An object of the present invention is to present the coating information on coating material that gives a desired tactile sensation to the user.

Solution to Problem

One aspect of the present invention is an information processing apparatus including:
a means for storing coating material information on coating material, and tactile sensation information in which the tactile sensation when each coating material is applied to the skin is recorded, the coating material information and the tactile sensation information is associated with each other;
a means for acquiring search criteria for at least one of tactile sensations and textures;
identifying at least one tactile sensation information corresponding to the acquired search criteria; and
a means for presenting the coating material information associated with the identified tactile sensation information.

Advantageous Effects of Invention

According to the present invention, it is possible to present coating information on coating material that gives a desired tactile sensation.

BRIEF DESCRIPTION OF DRAWINGS

FIG. 3 is a diagram showing a data structure of a user information database of the present embodiment.

FIG. 4 is a diagram showing a data structure of a coating material master database of the present embodiment.

FIG. 5 is a diagram showing a data structure of a search history information database of the present embodiment.

FIG. 6 is a diagram showing a data structure of a customized information database of the present embodiment.

FIG. 15 is a diagram showing a data structure of a coating material master database of fourth variation.

DESCRIPTION OF EMBODIMENTS

Figure 1:
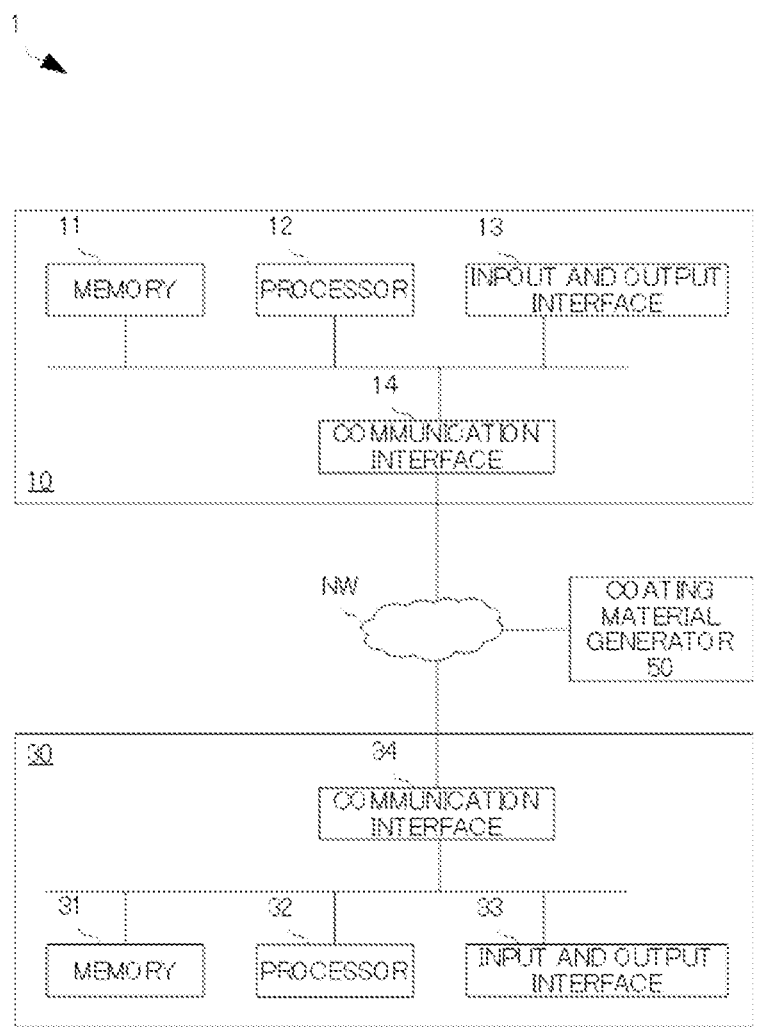
FIG. 1 is a block diagram showing a configuration of an information processing system according to the present embodiment.

Hereinafter, an embodiment of the present invention will be described in detail with reference to the drawings.

Note that, in the drawings for describing the embodiments, the same components are denoted by the same reference sign in principle, and the repetitive description thereof is omitted.

(1) Configuration of Information Processing System

The configuration of the information processing system will be described.

FIG. 1 is a block diagram showing a configuration of the information processing system according to the present embodiment.

As shown in FIG. 1, the information processing system 1 includes a client apparatus 10, a server 30, and a coating material generator 50.

The client apparatus 10 and the server 30 are connected with each other via a network (for example, the Internet or an intranet) NW.

The client apparatus 10 is an example of an information processing apparatus that transmits a request to the server 30.

The client apparatus 10 is, for example, a smartphone, a tablet terminal, or a personal computer.

The server 30 is an example of an information processing apparatus that provides the client apparatus 10 with a response in response to the request transmitted from the client apparatus 10.

The server 30 is, for example, a web server.

The coating material generator 50 is configured to generate coating material based on recipe information on the recipe of the coating material.

(1-1) Configuration of Client Apparatus

The configuration of the client apparatus 10 will be described with reference to FIG. 1.

As shown in FIG. 1, the client apparatus 10 includes a memory 11, a processor 12, an input and output interface 13, and a communication interface 14.

The memory 11 is configured to store programs and data.

The memory 11 is, for example, a combination of a ROM (read only memory), a RAM (random access memory), and a storage (for example, a flash memory or a hard disk).

The program includes, for example, the following program:
OS (operating system) program; and
application program (for example, web browser) that executes information processing.

For example, the date includes the following data:
database referenced in information processing; and
data obtained by executing information processing (that is, execution result of information processing).

The processor 12 activates a program stored in the memory 11 to cause a client to realize the function of the client apparatus 10.

The processor 12 is an example of a computer.

The input and output interface 13 is configured to acquire a user instruction from an input device connected to the client apparatus 10 and output information to an output device connected to the client apparatus 10.

The input device is, for example, a keyboard, a pointing device, a touch panel, or a combination thereof.

The output device is, for example, a display.

The communication interface 14 is configured to control communication between the client apparatus 10 and the server 30.

(1-2) Configuration of Server

The configuration of the server 30 will be described with reference to FIG. 1.

As shown in FIG. 1, the server 30 includes a memory 31, a processor 32, an input and output interface 33, and a communication interface 34.

The memory 31 is configured to store programs and data.

The memory 31 is, for example, a combination of ROM, RAM, and storage (for example, flash memory or hard disk).

The program includes, for example, the following program:
OS program; and
application program that executes information processing.

The data includes, for example, the following data:
database referenced in information processing; and
execution result of information processing.

The processor 32 is configured to activate a program stored in the memory 31 to cause a client to realize the function of the server 30.

The processor 32 is an example of a computer.

The input and output interface 33 is configured to acquire a user instruction from an input device connected to the server 30 and output information to an output device connected to the server 30.

The input device is, for example, a keyboard, a pointing device, a touch panel, or a combination thereof.

The output device is, for example, a display.

The communication interface 34 is configured to control communication between the server 30 and the client apparatus 10.

(1-3) Configuration of Coating Material Generator

The configuration of the coating material generator 50 will be described.

The coating material generator 50 includes a plurality of cartridges.

Each cartridge is removable with respect to the coating material generator 50.

Each cartridge contains a raw material for the coating material.

The coating material generator 50 acquires recipe information from an apparatus (for example, at least one of a client apparatus 10 and a server 30) connected to the coating material generator 50, and extracts the raw materials contained in the cartridge based on the acquired recipe information to generate the coating material corresponding to the recipe information.

(2) Summary of Embodiment

The summary of the present embodiment will be described.

Figure 2:
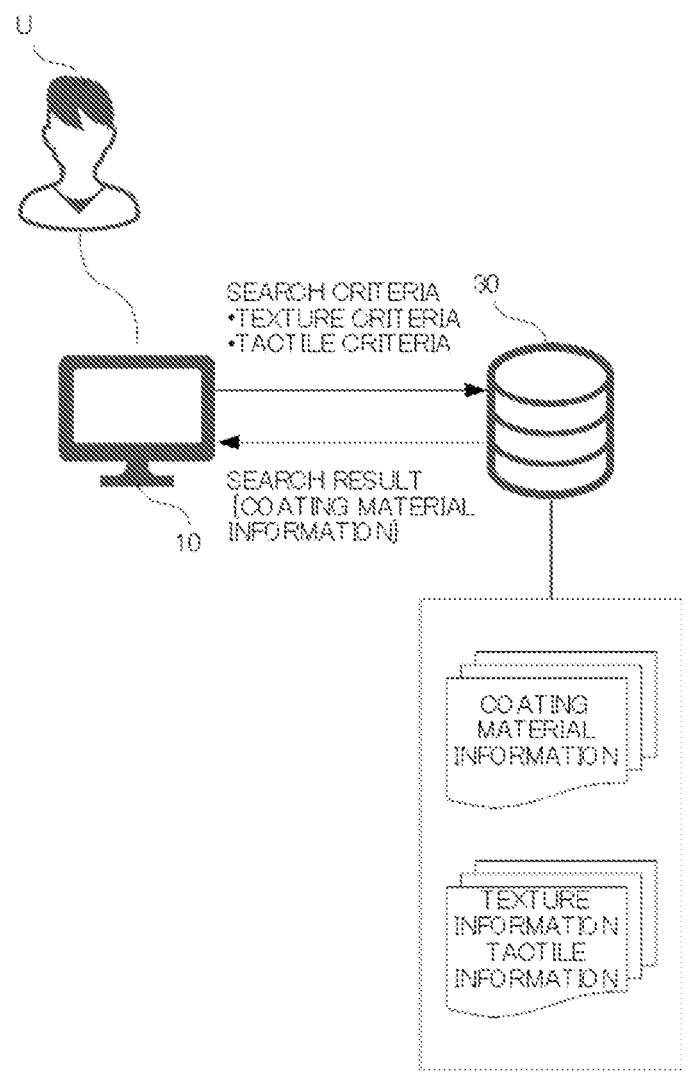
FIG. 2 is an explanatory diagram of a summary of the present embodiment.

FIG. 2 is an explanatory diagram of a summary of the present embodiment.

As shown in FIG. 2, the server 30 stores application information on the coating material, texture information on the texture when each coating material is applied to a human body, and tactile sensation when each coating material is applied to the human body which is associated with each other.

The server 30 acquires search criteria via the client apparatus 10. The search criteria include at least one of texture criteria relating to the texture and tactile sensation criteria relating to the tactile sensation.

The server 30 transmits the coating material information corresponding to the search criteria to the client apparatus 10.

Thereby, it can be provided the user U with the coating material information corresponding to the search criteria (that is, at least one of the texture criteria and the tactile sensation criteria).

In this way, the user U can acquire the coating information on the coating that reproduces at least one of the desired textures and tactile sensations.

(3) Database

The database of the present embodiment will be described.

The following database is stored in the memory 31.

(3-1) User Information Database

A user information database of the present embodiment will be described.

FIG. 3 is a diagram showing a data structure of a user information database of the present embodiment.

The user information database of FIG. 3 stores user information on the user.

The user information database includes a "USER ID" field, a "USER NAME" field, a "USER ATTRIBUTE" field, and a "DEVICE ID" field.

Each field is associated with each other.

A user ID is stored in the "USER ID" field.

The user ID is an example of user identification information that identifies each of a plurality of users.

Information on the user name (for example, text) is stored in the "USER NAME" field.

User attribute information on the user's attribute is stored in the "USER ATTRIBUTE" field.

The "USER ATTRIBUTES" field includes a plurality of subfields (for example, "GENDER" field and "AGE" field).

Information on the user's gender is stored in the "GENDER" field.

Information on the age of the user is stored in the "AGE" field.

Device ID that identifies the coating material generator 50 used by the user is stored in the "DEVICE ID" field.

(3-2) Coating Material Master Database

A coating material master database of the present embodiment will be described.

FIG. 4 is a diagram showing a data structure of a coating material master database of the present embodiment.

The coating material master database of FIG. 4 stores coating material information on the coating material.

The coating master database includes a "COATING MATERIAL ID" field, a "COATING MATERIAL NAME" field, a "TEXTURE" field, a "TACTILE SENSATION" field, and a "COMPONENT" field.

Each field is associated with each other.

The coating material ID is stored in the "COATING MATERIAL ID" field.

The coating material ID is an example of coating material identification information that identifies each of the plurality of coating material.

Information on the name of the coating (for example, text) is stored in the "COATING MATERIAL NAME" field.

In the "TEXTURE" field, texture information related to the texture (that is, texture) of the coating material is stored.

The texture information is, for example, a value representing a level for each of a plurality of texture indexes.

The texture index is represented, for example, by the following adjectives or onomatopoeia:
 smooth;
 moist;
 lightness of spread;
 change of spread;
 stickiness after application;
 thickness;
 change of thickness;
 freshness;
 adhesiveness;
 smoothness after application;
 stickiness after application; and
 moisture after application.

Each texture information is defined by the values of tactile sensation information elements (for example, vibration, friction, stickiness, hotness, and hardness).

As an example, the texture information of the texture index "moist" is defined by the following equation 1.

$$\text{Moist} = \alpha 1 \times \text{vibration} + \alpha 2 \times \text{friction} + \alpha 3 \times \text{adhesive} + \alpha 4 \times \text{hotness} + \alpha 5 \times \text{hardness} \quad \text{(Equation 1)}$$

$\alpha 1$: texture coefficient related to the vibration,
$\alpha 2$: texture coefficient related to friction,
$\alpha 3$: texture coefficient related to adhesive,
$\alpha 4$: texture coefficient related to hotness, and
$\alpha 5$: texture coefficient related to hardness Tactile sensation information is stored in the "TACTILE SENSATION" field. The tactile sensation information is arranged in chronological order regarding the physical quantity (for example, the physical quantity that can be acquired by the tactile sensation sensor) of tactile sensation when the coating material is applied to the human body is recorded.

The tactile sensation information includes, for example, at least one of the following:
 vibration information on the vibration of the skin to which the coating material is applied (for example, the frequency characteristics of the vibration acquired by the vibration sensor, the vibration sound acquired by the microphone, the binaural sound recorded by the binaural sound recorder (that is, sound information representing the vibration);
 friction information on the frictional force of the skin to which the coating material is applied (for example, a value indicating the frictional force acquired by the force sensor);
 adhesive information on the adhesive strength of the skin to which the coating material is applied (for example, value indicating the adhesive strength acquired by the adhesive feeling sensor);
 temperature information on the temperature of the skin to which the coating material is applied (for example, the value indicating the temperature acquired by the temperature sensor); and
 hardness information on the hardness of the skin to which the coating material is applied (for example, a value indicating hardness acquired by a hardness sensor)

The "COMPONENT" field stores component information on a component contained in the coating material.

The "INGREDIENT" field includes a plurality of subfields (for example, "COMPONENT NAME" field and "CONTENT RATIO" field).

Each subfield is associated with each other.

In the "COMPONENT NAME" field, the name (for example, text) of the component contained in the coating material is stored.

Information on the content ratio of the components contained in the coating is stored in the "CONTENT RATIO" field.

(3-3) Search History Information Database

A search history information database of the present embodiment will be described.

FIG. 5 is a diagram showing a data structure of the search history information database of the present embodiment.

The search history information database of FIG. 5 stores search history information related to the search history by the user.

The search history information database includes a "SEARCH HISTORY ID" field, a "DATE AND TIME" field, a "COATING MATERIAL ID" field, and a "SEARCH CRITERIA" field.

Each field is associated with each other.

The search history information database is associated with the user ID.

A search history ID is stored in the "SEARCH HISTORY ID" field.

The search history ID is an example of search history identification information that identifies a plurality of search histories.

Information on the date and time of the search is stored in the "DATE AND TIME" field.

The coating material ID of the coating material included in the search result is stored in the "APPLIED PRODUCT ID" field.

Information on the search criteria corresponding to the search result is stored in the "SEARCH CRITERIA" field.

(3-4) Customized Information Database A Customized Information Database of the Present Embodiment Will be Described FIG. 6 is a diagram showing a data structure of the customized information database of the present embodiment.

The customization information database of FIG. 6 stores customization information on the coating material information customized by the user.

The customization information database includes a "CUSTOMIZATION ID" field, an "ORIGINAL COATING MATERIAL ID" field, a "CUSTOMIZED TEXTURE" field, a "CUSTOMIZED TACTILE SENSATION" field, a "CUSTOMIZED COMPONENT" field, and an "ACCESS RIGHT" field.

Each field is associated with each other.

The customization information database is associated with the user ID.

A customization ID is stored in the "CUSTOMIZATION ID" field.

The customization ID is an example of customization identification information that identifies each of the plurality of customization information.

The coating material ID of the coating material (hereinafter referred to as "original coating material") that is the basis of the customized coating material is stored in the "ORIGINAL COATING MATERIAL ID" field.

Information on the texture of the customized coating material is stored in the "CUSTOMIZED TEXTURE" field.

The texture information is calculated by the server 30, for example, based on the information in the "TEXTURE" field, "COMPONENT" field, and the "CUSTOMIZED COMPONENT" field of the coating master database (FIG. 4).

Tactile sensation information on the tactile sensation when the customized coating material is applied to the human body is stored in the "CUSTOMIZED TACTILE SENSATION" field.

The tactile sensation information is calculated by the server 30 based on, for example, the information in the "TACTILE SENSATION" field, "COMPONENT" field, and the "CUSTOMIZED COMPONENT" field of the coating material master database (FIG. 4).

Customized component information on the customized coating material is stored in the "CUSTOMIZED COMPONENT" field.

The data structure of the "CUSTOMIZED COMPONENT" field is similar to that of the "COMPONENT" field (FIG. 4).

User ID of the user who can access the customized information is stored in the "ACCESS RIGHT" field.

(4) Information Processing

Information processing of the present embodiment will be described.

Figure 7:
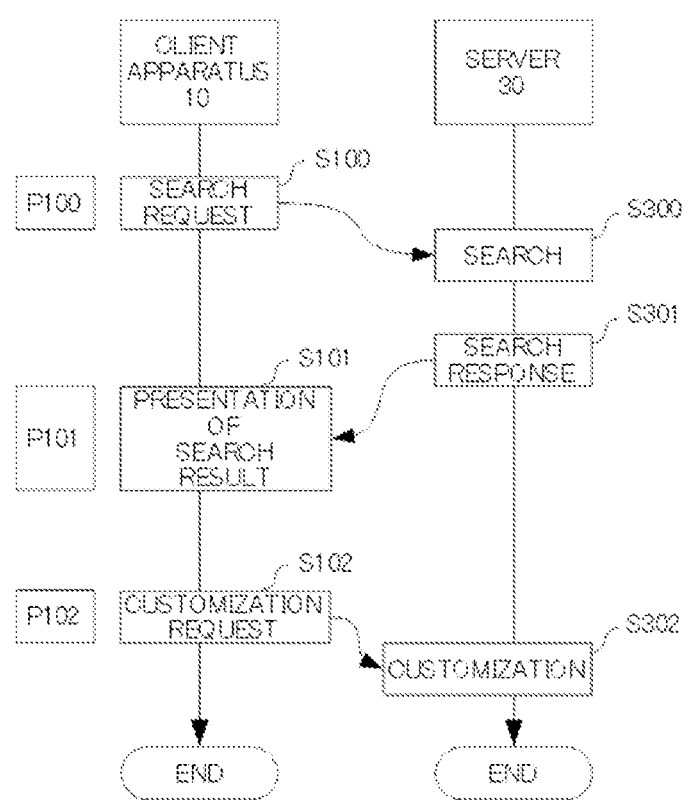
FIG. 7 is a flowchart of information processing according to the present embodiment.

FIG. 7 is a flowchart of the information processing of the present embodiment.

Figure 8:
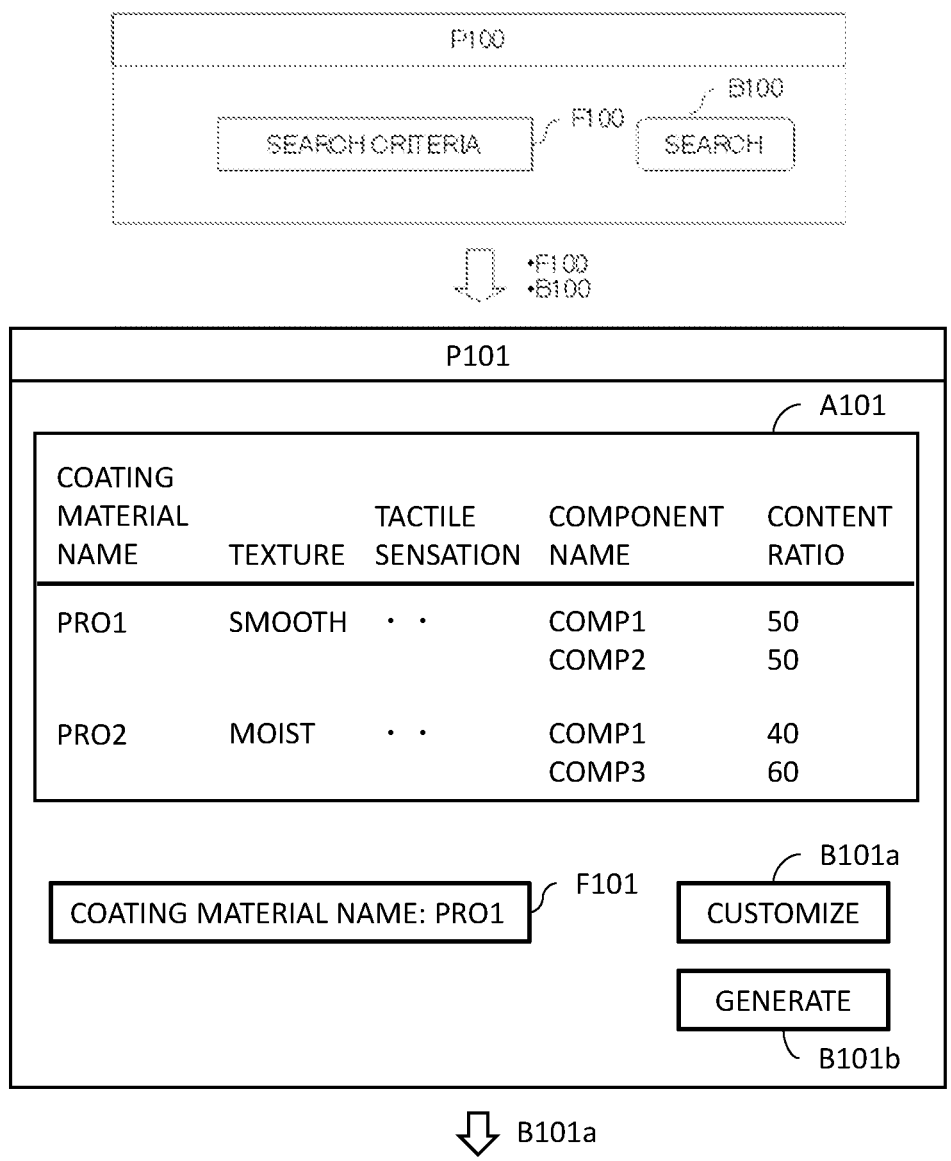
FIG. 8 is a diagram showing an example of a screen displayed in the information processing of FIG. 7.

FIG. 8 is a diagram showing an example of a screen displayed in the information processing of FIG. 7.

Figure 9:
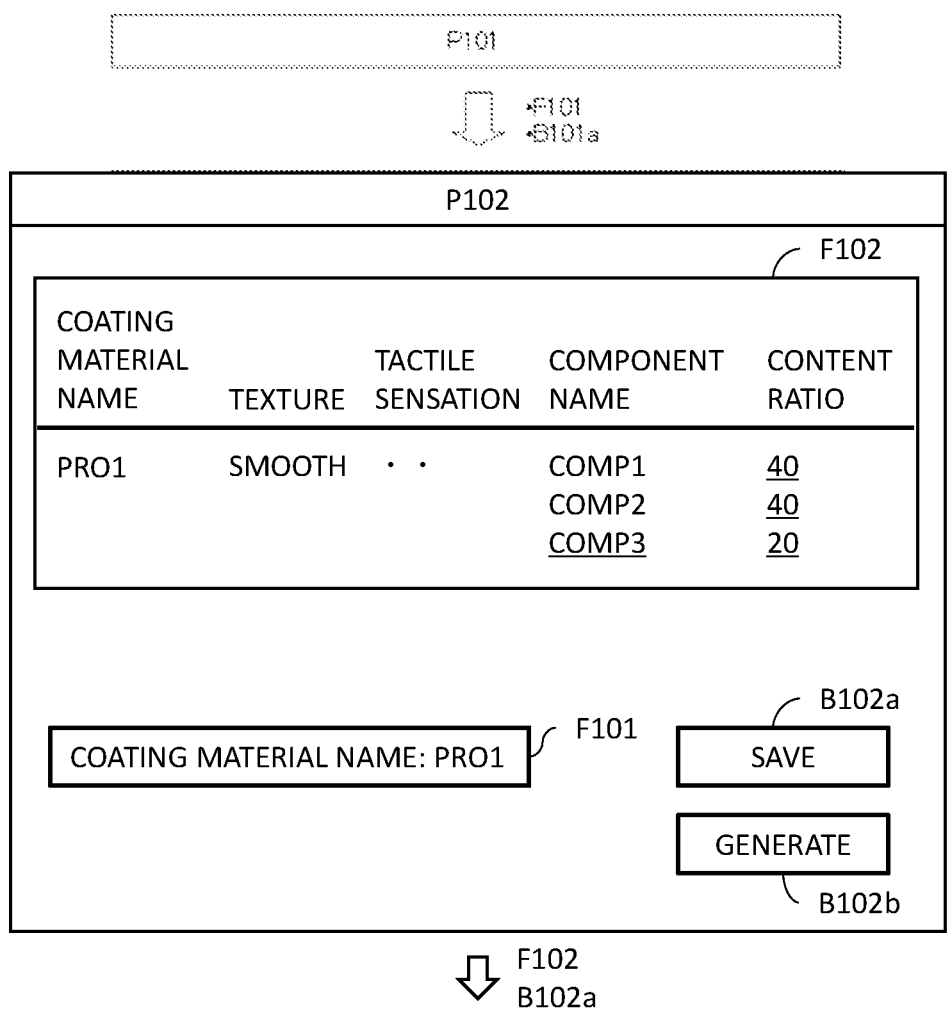
FIG. 9 is a diagram showing an example of a screen displayed in the information processing of FIG. 7.

FIG. 9 is a diagram showing an example of a screen displayed in the information processing of FIG. 7.

As shown in FIG. 7, the client apparatus 10 executes search request (S100).

Specifically, the processor 12 displays a screen P100 (FIG. 8) on the display.

The screen P100 includes an operation object B100 and a field object F100.

The operation object B100 is an object that receives a user instruction for confirming the user instruction given to the field object F100.

The field object F100 is an object that receives a user instruction for designating search criteria.

The search criteria include, for example, at least one of texture criteria and tactile sensation criteria.

The texture criteria include, for example, the same as or similar to at least one of the following, or thereof one included in the range designated by the user.
- texture information converted from measured values acquired by a sensor worn by the user
- texture information stored in advance in the memory 31 (not shown)
- texture information corresponding to effects designated by the user (for example, UV protection function or hypoallergenic type)
- texture information corresponding to the drug (raw material of the coating material) designated by the user.

Tactile sensation criteria include, for example, the same as or similar to at least one of the following, or thereof one included in the range designated by the user.
- tactile sensation information designated by the user
- tactile sensation information acquired by a sensor worn by the user
- tactile sensation information of the user stored in advance in the memory 31 (not shown)
- tactile sensation information of the coating material (for example, the lotion used by the user) designated by the user When the user designates search criteria in the field object F100 and operates the operation object B100, the processor 12 transmits the search request data to the server 30.

The search request data includes the following information:
 user ID of the user; and
 search criteria accepted by the field object F100.

After the step S100, the server 30 executes a search (S300).

Specifically, the processor 32 refers to the coating material master information database (FIG. 4) and identifies a record corresponding to the search criteria included in the search request data.

As a first example, if the search criteria include texture criteria, the processor 32 refers to the "TEXTURE" field and identifies at least one of records including the texture information on the texture that is the same as or similar to the texture reproduced by the texture criteria, or on the texture included in the user-designated.

As a second example, if the search criteria include tactile sensation criteria, the processor 32 refers to the "TACTILE SENSATION" field and identifies at least one of records including the tactile sensation information on the tactile sensation that is the same as or similar to the tactile sensation reproduced the tactile sensation criteria, or on the tactile sensation included in the user-designated range.

The processor 32 adds a new record to the search history information database (FIG. 5) associated with the user ID included in the search request data.

The following information is stored in each field of the new record:
- new search history ID is stored in the "SEARCH HISTORY ID" field;
- information on the execution date and time of step S300 is stored in the "DATE AND TIME" field;
- the coating material ID included in the identified record is stored in the "COATING MATERIAL ID" field; and
- information on the search criteria included in the search request data is stored in the "SEARCH CRITERIA" field. As a result, the search result is stored in association with the user ID.

After the step S300, the server 30 executes a search response (S301).

Specifically, the processor 32 transmits search response data to the client apparatus 10.

The search response data includes information (coating material ID, information on the coating material name, texture information, and component information) stored in the record identified in the step S300.

After the step S301, the client apparatus 10 executes presentation of the search result (S101).

Specifically, the processor 12 displays a screen P101 (FIG. 8) on the display.

The screen P101 includes a display object A101, operation objects B101*a* to B101*b*, and a field object F101.

On the display object A101, information (the name of the coating material, texture information, tactile sensation information, and component information) included in the search response data is displayed.

The operation object B101*a* is an object that receives a user instruction regarding customization.

The operation object B101*b* is an object that receives a user instruction regarding the generation of the coating material.

The field object F101 is an object that receives a user instruction for designating information identifying the coating material to be customized (for example, information on the coating material name).

After the step S101, the client apparatus 10 executes customization request (S102).

Specifically, when the user designates the name of the coating material to be customized in the field object F101 and operates the operation object B101*a*, the processor 12 displays a screen P102 (FIG. 9) on the display.

The screen P102 includes operation objects B102*a* to B102*b* and a field object F102.

The operation object B102*a* is an object that receives a user instruction for storing customized coating material information in the server 30.

The operation object B102*b* is an object that receives a user instruction for causing the coating material generator 50 to generate coating material corresponding to the customized coating material information.

The field object F102 is an object that receives a user instruction for customizing the coating material information.

When the user gives a user instruction to the field object F102 and operates the operation object B102*a*, the processor 12 transmits customization request data to the server 30.

The customization request data includes user instructions given to the field object F102 (for example, a tactile customization instruction, a texture customization instruction, a component name customization instruction, and a content ratio customization instruction).

After the step S102, the server 30 executes customization (S302).

Specifically, the processor 32 adds a new record to the customized information database (FIG. 6) associated with the user ID included in the search request data.

The following information is stored in each field of the new record:
- new customization ID is stored in the "CUSTOMIZATION ID" field;
- the coating material ID included in the search response data is stored in the "ORIGINAL COATING MATERIAL ID" field;
- the customized component information (information based on a customization instruction regarding the component name and a customization instruction regarding the content ratio) included in the customization request data is stored in the "CUSTOMIZED COMPONENT" field;
- the texture information based on the customization instruction related to the texture included in the customization request data is stored in the "CUSTOMIZED TEXTURE" field; and
- the tactile sensation information based on the customization instruction regarding the tactile sensation included in the customization request data is stored in the "Customized tactile sensation" field.

As a result, the customized coating material information is stored in association with the user ID.

As described above, according to the present embodiment, it is possible to present the user with the coating material information on the coating material that gives a desired tactile sensation.

From the coating material information, the user can specify coating material capable of providing the desired tactile sensation.

As a result, it is possible to promote consumers who place importance on tactile sensation to purchase the coating material.

(5) Variation Example

Variation examples of the present embodiment will be described.

(5-1) First Variation

First variation will be described.

The first variation is an example in which the information of a certain user (hereinafter referred to as "first user") is shared with at least one other user (hereinafter referred to as "second user").

(5-1-1) Summary of First Variation

A summary of the first variation will be described.

Figure 10:
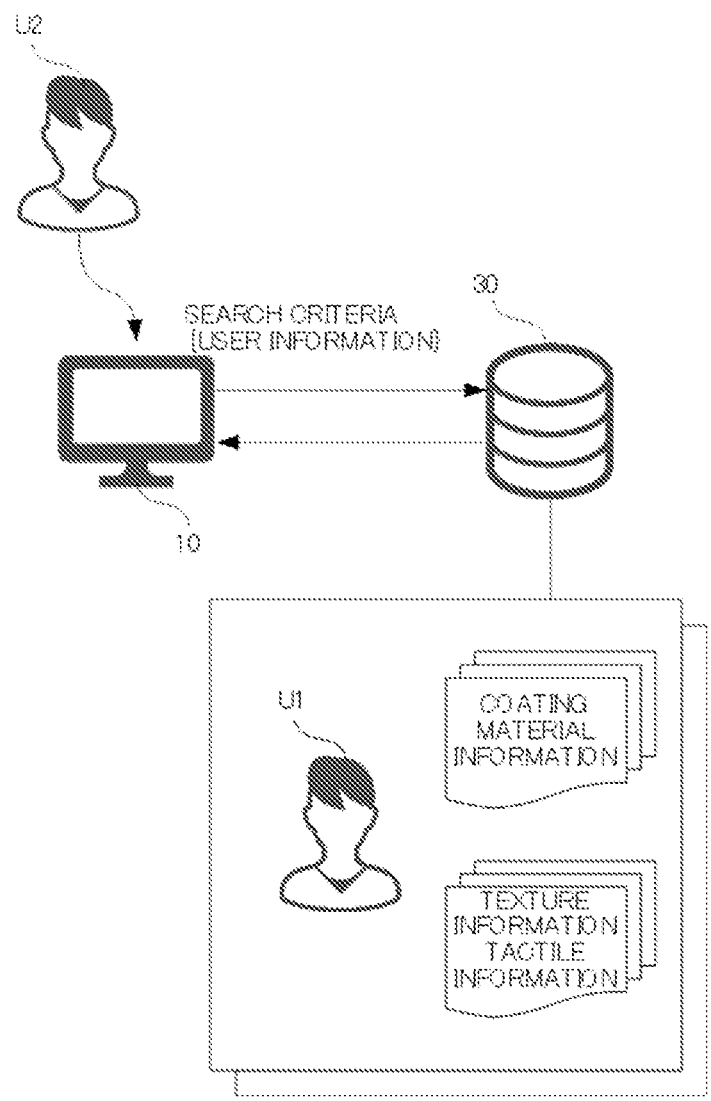
FIG. 10 is an explanatory diagram of a summary of first variation.

FIG. 10 is an explanatory diagram of a summary of first variation.

As shown in FIG. 10, the server 30 stores the user ID, the coating material information, the texture information, and the tactile sensation information in association with each other.

The user U2 transmits search criteria to the server 30 via the client apparatus 10.

The search criteria include user information on the user U1 other than the user U2.

The server 30 identifies a user who corresponds to the user information included in the search criteria.

The server 30 transmits the coating material information associated with the identified user to the client apparatus 10.

As a result, it is possible to provide the user U2 with the coating material information of the user U1 corresponding to the search criteria designated by the user U2.

In this way, the user U2 can acquire the coating material information of the other user U1.

(5-1-2) Information Processing

The information processing of the first variation will be described.

Figure 11:
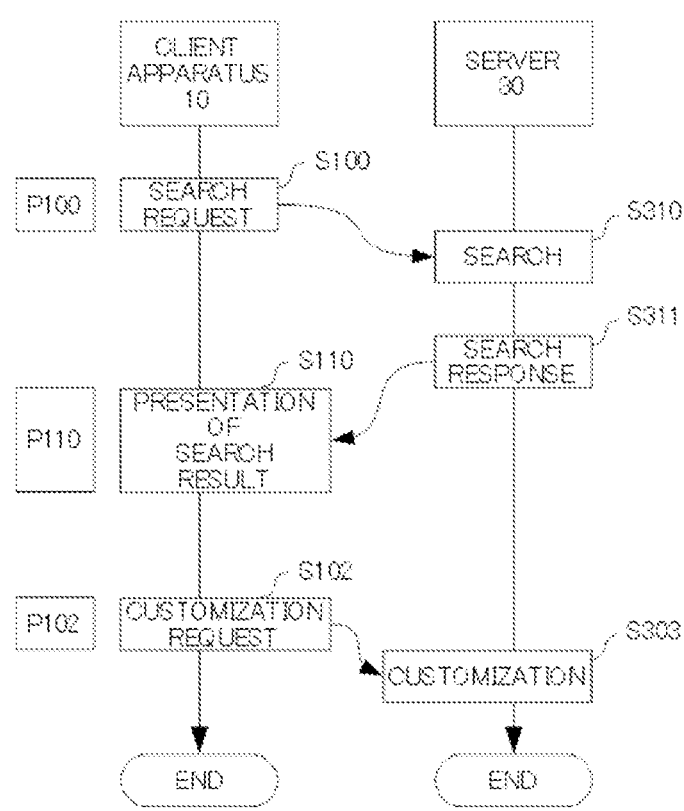
FIG. 11 is a flowchart of information processing of first variation.

FIG. 11 is a flowchart of information processing of first variation.

Figure 12:
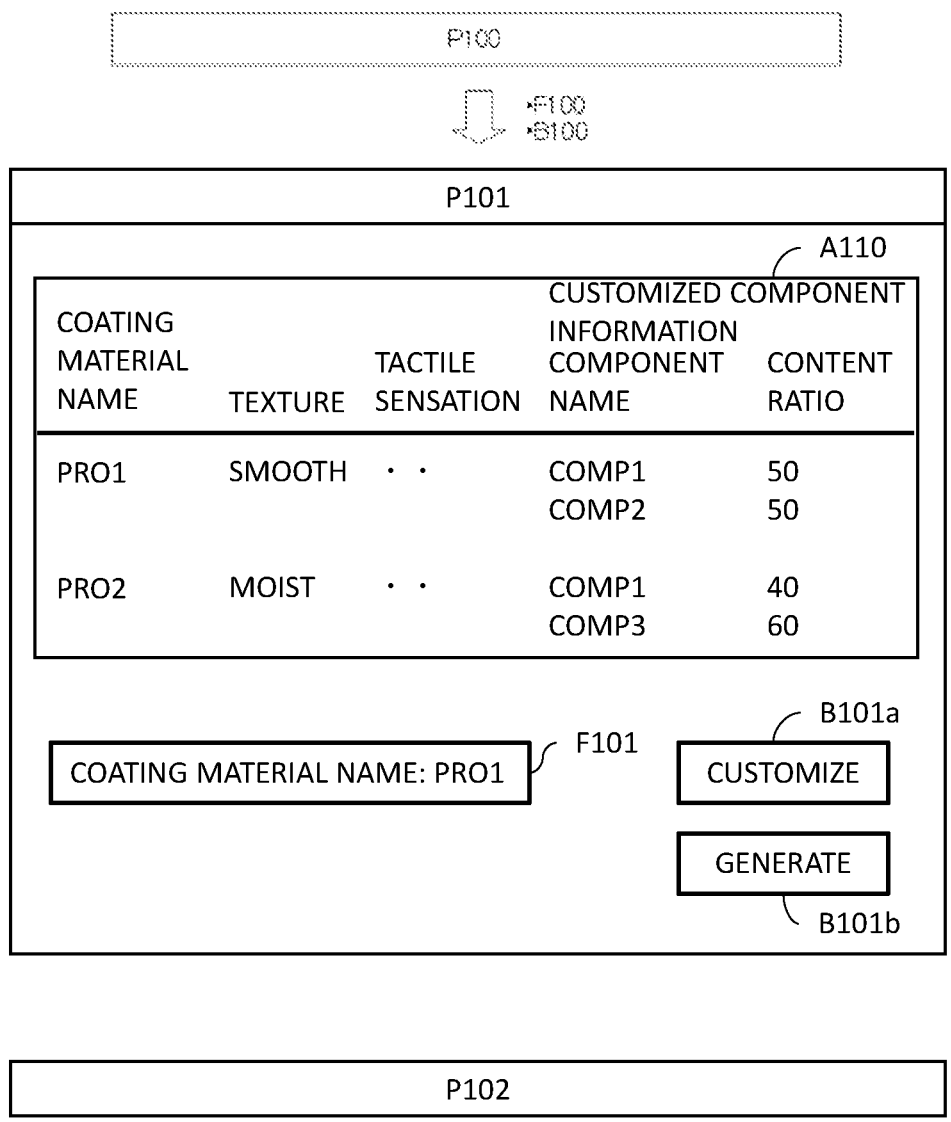
FIG. 12 is a diagram showing an example of a screen displayed in the information processing of FIG. 11.

FIG. 12 is a diagram showing an example of a screen displayed in the information processing of FIG. 11.

As shown in FIG. 11, the client apparatus 10 executes the step S100 (FIG. 7).

After the step S100, the server 30 executes a search (S310).

Specifically, the processor 32 refers to the coating material master information database (FIG. 4) and identifies a record (hereinafter referred to as "target coating material master record") corresponding to the search criteria included in the search request data.

The processor 32 refers to the customization information database (FIG. 6), and identifies a record (hereinafter referred to as "target customization record") including the coating material ID of the target coating material master record in the "ORIGINAL COATING MATERIAL ID" field and the user ID of the user using the client apparatus 10 in the "ACCESS RIGHT" field.

The processor 32 adds a new record to the search history information database (FIG. 5) associated with the user ID included in the search request data.

The following information is stored in each field of the new record:
  new search history ID is stored in the "SEARCH HISTORY ID" field;
  information on the execution date and time of step S310 is stored in the "DATE AND TIME" field;
  customization ID included in the target customization record is stored in the "COATING MATERIAL ID" field; and
  information on the search criteria included in the search request data is stored in the "SEARCH CRITERIA" field.

As a result, the search result is stored in association with the user ID.

After the step S310, the server 30 executes a search response (S311). Specifically, the processor 32 transmits search response data to the client apparatus 10.

The search response data includes information stored in the target customization record identified in the step S310 (customized component information) and information stored in the target coating master record (coating material name and texture of the original coating).

After the step S311 the client apparatus 10 executes presentation of the search result (S110).

Specifically, the processor 12 displays a screen P110 (FIG. 12) on the display.

The screen P110 includes a display object A110, operation objects B101a to B101b, and a field object F101.

The operation objects B101a to B101b and the field object F101 are the same as those included in the screen P101 (FIG. 8).

On the display object A110, the information included in the search response data (customized component information, coating material name and texture of the original coating material) is displayed.

After the step S110, the client apparatus 10 executes the step S102 (FIG. 7).

After the step S102, the server 30 executes the step S303 (FIG. 7).

According to the first variation, it is possible to provide the user with the customized coating material information of the public user.

As a result, the user can refer to not only the coating material information stored in advance in the server 30 but also the coating material information customized by another user.

(5-2) Second Variation

Second variation will be described.

The second variation is an example in which the coating material generator 50 generates coating material based on the recipe information obtained as a result of the processing of the client apparatus 10 and the server 30.

(5-2-1) Summary of Second Variation

A summary of second variation will be described.

Figure 13:
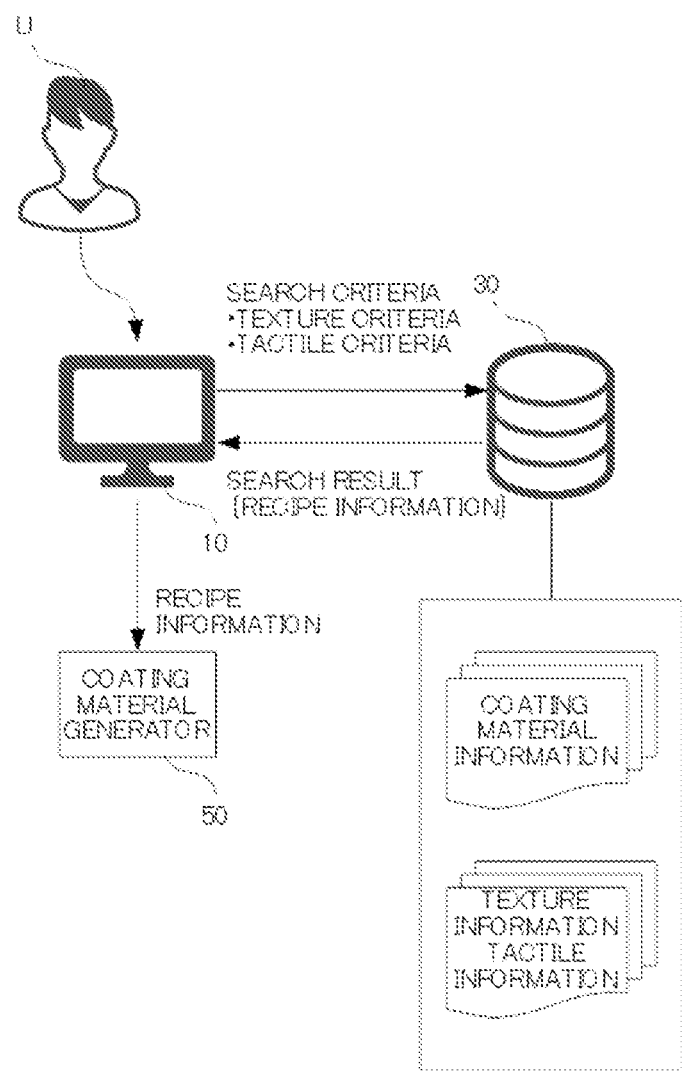
FIG. 13 is an explanatory diagram of a summary of second variation.

FIG. 13 is an explanatory diagram of a summary of second variation.

As shown in FIG. 13, the server 30 stores the coating material information, the texture information, and the tactile sensation information in association with each other.

The user U transmits the search criteria to the server 30 via the client apparatus 10.

The search criteria include at least one of texture criteria and tactile sensation criteria.

The server 30 identifies the coating information associated with the search criteria.

The server 30 transmits the recipe information on the recipe for reproducing the coating material corresponding to the identified coating material information to the client apparatus 10.

The client apparatus 10 transmits the recipe information transmitted from the server 30 to the coating material generator 50 in response to the instruction of the user U.

The coating material generator 50 generates coating material based on the recipe information transmitted from the client apparatus 10.

As a result, the user U can easily acquire the coating material corresponding to the search criteria designated by the user U via the coating material generator 50.

(5-2-2) Information Processing

Information processing of the second variation will be described.

Figure 14:
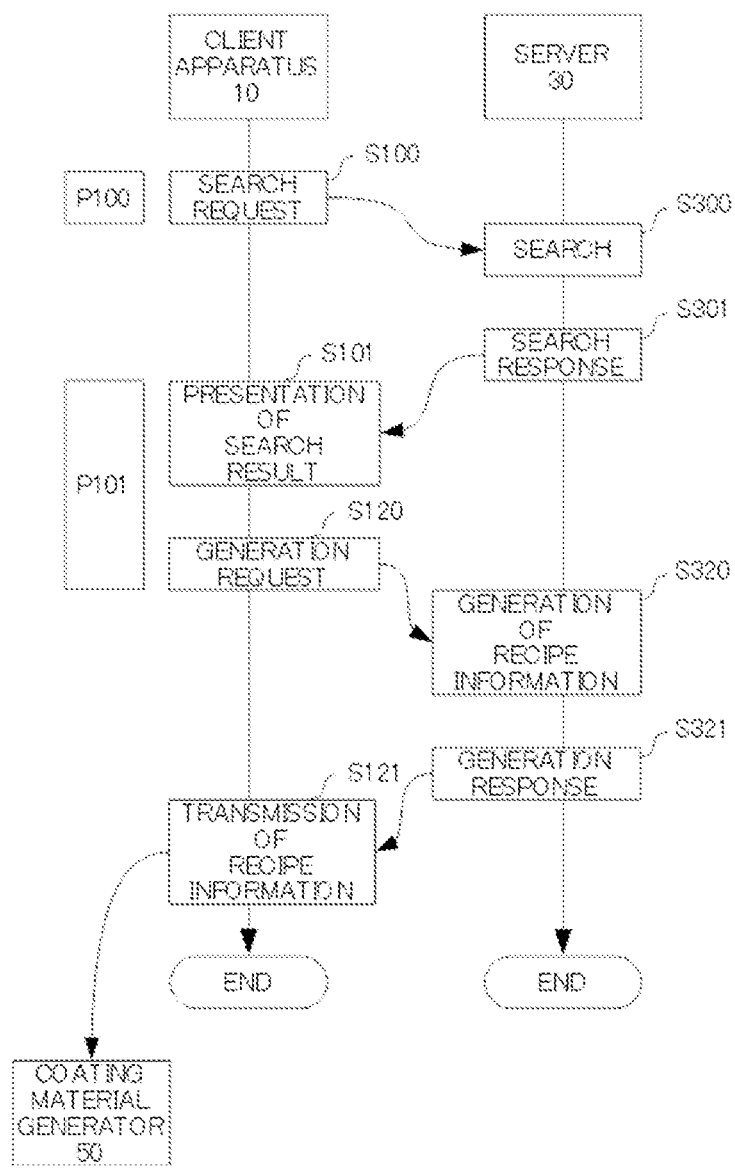
FIG. 14 is a flowchart of information processing of second variation.

FIG. 14 is a flowchart of information processing of second variation.

As shown in FIG. 14, the client apparatus 10 executes the step S100 (FIG. 7).

After the step S100, the server 30 executes the steps S300 to S301 (FIG. 7).

After the step S301, the client apparatus 10 executes the step S101 (FIG. 7).

After the step S101, the client apparatus 10 executes generation request (S120).

Specifically, when the user designates the name of the coating material to be generated in the field object F101 and operates the operation object B101b, the processor 12 transmits generation request data to the server 30.

The generation request data includes, for example, the coating material ID corresponding to the user instruction (coating material name) given to the field object F101.

After the step S120, the server 30 executes generation of recipe information (S320).

Specifically, the processor 32 refers to the user information database (FIG. 3) to identify the device ID associated with the user ID included in the search request data.

The processor 32 refers to the coating material master database (FIG. 4) to identify the record associated with the coating material ID included in the generation request data.

The processor 32 generates recipe information for causing the coating material generator 50 to generate the coating material corresponding to the coating material ID based on the information in the "COMPONENT" field of the record.

The recipe information includes, for example, information in the "INGREDIENT" field (content ratio for each component name).

After the step S320, the server 30 executes a generation response (S321).

Specifically, the processor 32 transmits generated response data to the client apparatus 10.

The generated response data includes, for example, the following information:
  device ID identified in the step S320; and
  recipe information generated in the step S320.

After the step S321, the client apparatus 10 executes transmission of recipe information (S121).

Specifically, the processor 12 establishes communication with the coating material generator 50 corresponding to the device ID included in the generated response data.

The processor 12 transmits the recipe information included in the generation response data to the coating material generator 50.

After the step S121, the coating material generator 50 generates coating material based on the recipe information transmitted from the client apparatus 10.

Specifically, the coating material generator 50 extracts the raw material in an amount corresponding to the content ratio included in the recipe information from the cartridge containing the raw material corresponding to each component name included in the recipe information.

As a result, the coating material corresponding to the recipe information is generated by the coating material generator 50.

According to the second variation, the coating material corresponding to the search criteria designated by the user is generated by the coating material generator 50.

This allows the user to easily acquire coating material providing the user with experience the desired tactile sensation.

When the server 30 and the coating material generator 50 are connected, the step S121 can be omitted.

In this case, in the step S321, the processor 32 transmits the recipe information to the coating material generator 50 corresponding to the device ID identified in the recipe information.

(5-3) Third Variation

Third variation will be described.

The third variation is an example in which search criteria is designated using a microphone.

The client apparatus 10 of the third variation includes a microphone configured to input an audio signal.

In the step S100 (FIG. 7), when the user applies the coating material to the skin, the microphone inputs an audio signal regarding the vibration sound of the skin when the coating material is applied.

The processor 12 transmits the search request data to the server 30. The search request data includes the following information:
  user ID of the user; and
  voice signal input by the microphone.

In the step S300 (FIG. 7), the processor 32 refers to the coating material master information database (FIG. 4) and identifies a record corresponding to search criteria included in the search request data.

Specifically, the processor 32 identifies at least one record storing vibration information having a waveform similar to the waveform of the audio signal included in the search request data.

The processor 32 adds a new record to the search history information database (FIG. 5) associated with the user ID included in the search request data.

The following information is stored in each field of the new record:
  new search history ID is stored in the "SEARCH HISTORY ID" field;
  information on the execution date and time of the step S300 is stored in the "DATE AND TIME" field;
  the coating material ID included in the identified record is stored in the "COATING MATERIAL ID" field; and
  information on the search criteria included in the search request data is stored in the "SEARCH CRITERIA" field.

As a result, the search result is stored in association with the user ID.

According to the third variation, the user can search the coating material information on the coating material by using the coating material.

(5-4) Fourth Variation

Fourth variation will be described.

The fourth variation is an example relating to the coating material master database.

FIG. 15 is a diagram showing a data structure of a coating material master database of a fourth variation.

(5-4-1) First Example of Fourth Variation

The first example of the fourth variation will be described.

The coating material master database of FIG. 15A is associated with skin condition information relating to skin condition.

The skin condition information is, for example, a skin condition code indicating the skin condition.

In the step S100 (FIG. 7), the client apparatus 10 of the first example of the fourth variation acquires a skin condition code indicating the skin condition of the user as search criteria.

The skin condition of the user is, for example, any of the following:
skin; and
skin to which lotion is applied.

As a first example, the processor 12 identifies a skin condition code based on the skin condition input by the user in the field object F100.

The processor 12 transmits search request data to the server 30.

The search request data includes the following information:
user ID of the user; and
skin condition code.

In the step S300 (FIG. 7), the server 30 of the first example of the fourth variation refers to the coating material master database (FIG. 15A) associated with the skin condition code included in the search request data, and identifies the record corresponding to the search criteria included in the search request data.

The processing after the record is identified is the same as that of the present embodiment.

According to the first example of the fourth variation, at least one of the tactile sensation information and the texture information, and the coating material information according to the combination of the skin conditions can be presented.

(5-4-2) Second Example of Fourth Variation

A second example of fourth variation will be described.

The coating master database of FIG. 15B is associated with applicator ID that identifies the coating (for example, cotton or puff) used when applying the coating material to the human body.

The applicator ID is an example of the applicator identification information.

The client apparatus 10 of the second example of the fourth variation acquires applicator ID as the search criteria in the step S100 (FIG. 7).

Specifically, the processor 12 transmits the search request data to the server 30.

The search request data includes the following information:
user ID of the user; and
applicator ID entered by the user in the field object F100.

In the step S300 (FIG. 7), the server 30 of the second example of the fourth variation refers to the coating material master database (FIG. 15A) associated with the skin condition code included in the search request data, and identifies the records corresponding to the search criteria included in the search request data.

The processing after the record is identified is the same as that of the present embodiment.

According to the second example of the fourth variation, at least one of the tactile sensation information and the texture information, and the coating material information according to the combination of the applicator can be presented.

(5-5) Fifth Variation

Fifth variation will be described.

Fifth variation is an example of the screen that receives a user instruction regarding customization.

Figure 16A:
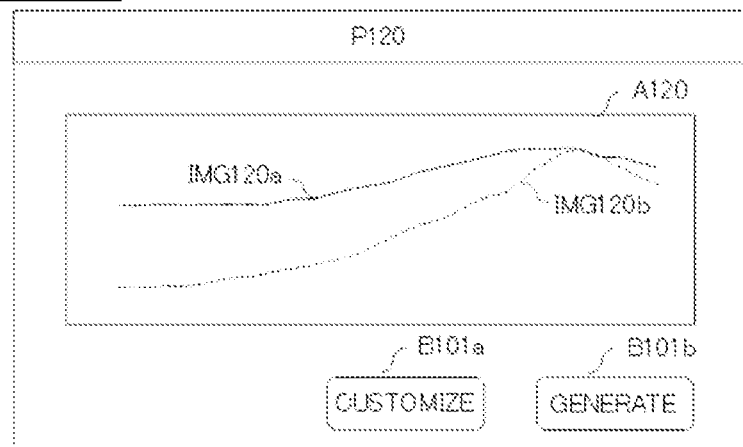
FIG. 16 is a diagram showing a screen example displayed in the information processing of fifth variation.
Figure 16B:
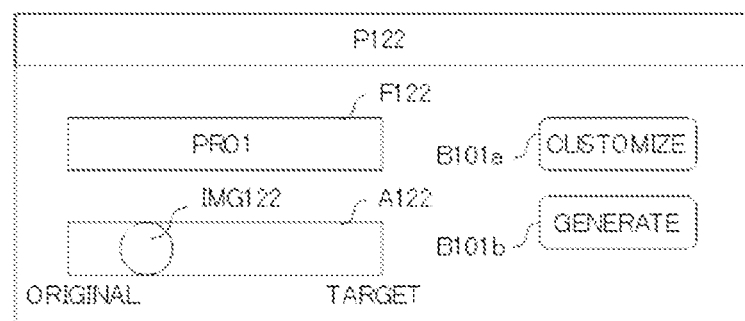
Figure 16C:
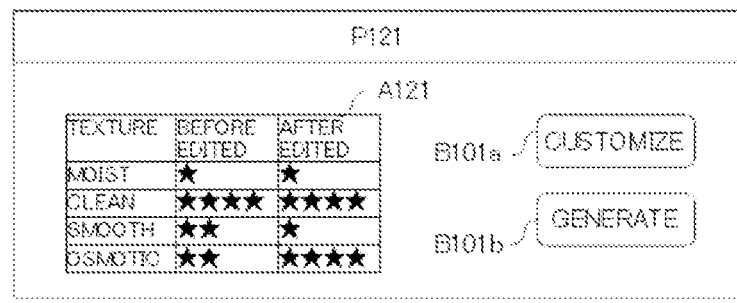

FIG. 16 is a diagram showing a screen example displayed in the information processing of fifth variation.

(5-5-1) First Example of Fifth Variation

The first example of the fifth variation will be described.

In the step S101 (FIG. 7), the client apparatus 10 of the first example of the fifth variation displays the screen P120 (FIG. 16A) on the display.

The screen P120 includes a display object A120 and operation objects B101a to B101b.

The operation objects B101a to B101b are the same as those in FIG. 8.

The image objects IMG120a to IMG120b are displayed as the display object A120.

The image object IMG120a is an image of a graph representing tactile sensation information before customization.

The image object A120b is an image of a graph representing tactile sensation information after customization.

Each plot in the image object A120b is configured to move according to a user instruction.

When the user gives a user instruction regarding the movement of the plot, the image object IMG120b changes according to the user instruction.

After the step S101, in the step S102 (FIG. 7), the client apparatus 10 transmits customization request data to the server 30.

The customization request data includes tactile sensation information represented by the image object IMG120b.

(5-5-2) Second Example of Fifth Variation

A second example of the fifth variation will be described.

The client apparatus 10 of the second example of the fifth variation displays the screen P121 (FIG. 16B) on the display in the step S101 (FIG. 7).

The screen P121 includes a display object A121 and operation objects B101a to B101b.

The operation objects B101a to B101b are the same as those in FIG. 8.

The level of the texture is displayed on the display object A121.

When the user adds or removes the star in the "after editing" column, the processor 12 receives user instructions for customizing the texture level.

After the step S101, in the step S102 (FIG. 7), the processor 12 transmits customization request data to the server 30.

The customization request data includes information on the level of the texture displayed on the display object A121.

In the step S102 (FIG. 7), the client apparatus 10 transmits customization request data to the server 30.

The customization request data includes the texture information displayed on the display object A121.

(5-5-3) Third Example of Fifth Variation

A third example of the fifth variation will be described.

The client apparatus 10 of the third example of the fifth variation displays the screen P122 (FIG. 16C) on the display in the step S101 (FIG. 7).

The screen 122 includes a display object A122, operation objects B101a to B101b, a field object F122, and an image object IMG122.

The operation objects B101a to B101b are the same as those in FIG. 8.

When a user instruction (for example, the name of the coating material) for designating the coating material is given to the field object F122, the image object IMG22 showing the difference between the tactile sensation information of the coating material given to the field object F122 and the tactile sensation information to be customized by the user is displayed on the display object A122.

When the user moves the image object IMG22 to the "TARGET" side, the customized tactile sensation information becomes similar to the tactile sensation information of the coating material designated by the user.

On the other hand, when the user moves the image object IMG22 to the "START" side, the customized tactile sensation information becomes dissimilar to the tactile sensation information of the coating material designated by the user.

(5-6) Sixth Variation

Sixth variation will be described.

The sixth variation is an example of adjusting the texture of the coating material information according to the preference of the user.

(5-6-1) First Example of Sixth Example

A first example of the sixth example will be described.

In the step S301, the processor 32 of the server 30 of the first example of the sixth example identifies the search history information database (FIG. 5) associated with the user ID included in the search request data.

The processor 32 refers to the "COATING MATERIAL ID" of the identified search history information database, and identifies coating material ID (that is, coating material ID frequently searched by the user) whose search frequency is the same as a predetermined number of times or more.

The processor 32 refers to the coating master database (FIG. 4) and identifies the value of the information in each subfield of the "TEXTURE" field associated with the identified coating material ID.

The processor 32 estimates the user's preferred texture level based on the identified value (that is, the level of the texture of the coating material frequently searched by the user).

The processor 32 corrects the information in the "TEXTURE" field of the record identified in the step S300 based on the estimated level.

The processor 32 corrects the information in the "TACTILE SENSATION" field according to the information in the corrected "TEXTURE" field.

The processor 32 calculates the content ratio of the component for realizing the corrected texture and tactile sensation based on the information in the corrected "TEXTURE" field and the information in the corrected "TACTILE SENSATION" field.

The processor 32 transmits search response data including the information in the corrected "TEXTURE" field and the information in the corrected "TACTILE SENSATION" field, and the calculated content ratio to the client apparatus 10.

According to the first example of the sixth variation, the user can acquire the coating material information according to own preference reflected in own search history.

(5-6-2) Second Example of Sixth Variation

A second example of sixth variation will be described.

In the step S301, the processor 32 of the server 30 of the second example of the sixth example identifies the search history information database (FIG. 5) associated with the user ID of an unspecified number of users.

The processor 32 refers to the "COATING MATERIAL ID" of the identified search history information database, and identifies the coating material ID whose search frequency is the same as a predetermined number of times or more (that is, the coating material ID of the coating material frequently searched by an unspecified number of users).

The processor 32 refers to the coating master database (FIG. 4) and identifies the value of the information in each subfield of the "TEXTURE" field associated with the identified coating material ID.

The processor 32 estimates the level of texture of average user's preference based on the identified value (that is, the level of texture of the coating material frequently searched by an unspecified number of users).

The processor 32 corrects the information in the "TEXTURE" field of the record identified in the step S300 based on the estimated level.

The processor 32 corrects the information in the "TACTILE SENSATION" field according to the information in the corrected "TEXTURE" field.

The processor 32 calculates the content ratio of the component for realizing the corrected texture and tactile sensation based on the information in the corrected "TEXTURE" field and the information in the corrected "TACTILE SENSATION" field.

The processor 32 transmits search response data including the information in the corrected "TEXTURE" field, the information in the corrected "TACTILE SENSATION" field, and the calculated content ratio to the client apparatus 10.

According to the second example of the sixth variation, the user can acquire the coating material information according to the preference reflected in the user's search history corresponding to the user information stored in the memory 31.

(5-6-3) Third Example of Sixth Variation

A third example of the sixth variation will be described.

In the step S301, the processor 32 of the server 30 of the third example of the sixth example refers to the user database (FIG. 3), and identifies user attribute information (for example, a combination of the gender and the age) associated with the user ID included in the search request data.

The processor 32 refers to the user database and identifies user ID associated with user attribute information which is the same as or similar to the identified user attribute information.

The processor 32 identifies the search history information database (FIG. 5) associated with the identified user ID.

The processor 32 refers to the "COATING MATERIAL ID" of the identified search history information database, and identifies the coating material ID (that is, the coating material of the coating material ID which is frequently searched by a plurality of users having similar user attributes to each other) whose search frequency is the same as a predetermined number or more.

The processor 32 refers to the coating master database (FIG. 4) and identifies the value of the information in each subfield of the "TEXTURE" field associated with the identified coating material ID.

The processor 32 estimates the level of texture of preference among a plurality of users with similar user attributes based on the identified value (that is, the level of texture of the coating material frequently searched by a plurality of users having similar user attributes to each other).

The processor 32 corrects the information in the "TEXTURE" field of the record identified in the step S300 based on the estimated level.

The processor 32 corrects the information in the "TACTILE SENSATION" field according to the information in the corrected "TEXTURE" field.

The processor 32 calculates the content ratio of the component for realizing the corrected texture and tactile sensation based on the information in the corrected "TEXTURE" field and the information in the corrected "TACTILE SENSATION" field.

The processor 32 transmits search response data including the corrected "TEXTURE" field information, the corrected "TACTILE SENSATION" field information, and the calculated content ratio to the client apparatus 10.

According to the third example of the sixth variation, the user can acquire the coating material information according to the preference reflected in the search history of the user having the user attribute similar to that of the user.

(5-6-4) Fourth Example of Sixth Variation

A fourth example of the sixth variation will be described.

The server 30 of the fourth example of the sixth variation generates recipe information including the corrected component information obtained by any one of the first to third examples of the sixth variation.

This recipe information is information for producing coating material of the components depending on the preference reflected in the user's own search history, the user's search history corresponding to the user information stored in the memory 31, or the search history of a user with user attributes similar to the user.

When the coating material generator 50 acquires the recipe information generated by the server 30 via the client apparatus 10, the coating material generator 50 generates the coating material based on the recipe information.

According to the fourth example of the sixth variation, it is possible to easily acquire coating material having a component according to the preference reflected in own search history, the user's search history corresponding to the user information stored in the memory 31, or the search history of a user with a user attribute similar to that of the user.

(6) Summary of Embodiment

A summary of the present embodiment will be described.

The first aspect of the present embodiment is an information processing apparatus including:

a means (for example, the processor 32 managing the coating material database (FIG. 4)) for storing coating material information on coating material, and tactile sensation information in which the tactile sensation when each coating material is applied to the skin is recorded, the coating material information and the tactile sensation information is associated with each other;

a means (for example, the processor 32 executing the step S300) for acquiring search criteria for at least one of tactile sensations and textures;

a means (for example, the processor 32 executing the step S300) for identifying at least one tactile sensation information corresponding to the acquired search criteria; and a means (for example, the processor 32 executing the step S301) for presenting the coating material information associated with the identified tactile sensation information.

According to the first aspect, the coating material information of the coating material corresponding to the search criteria is presented.

As a result, it is possible to provide the user U with the coating material information corresponding to the search criteria designated by the user U.

In this way, the user U can acquire the coating material information on the coating material that reproduces the desired texture by designating the tactile sensation.

In the second aspect of the present embodiment, the coating material information includes component information on a plurality of components of the coating material, and the means for presenting presents the component information associated with the identified coating material information.

According to the second aspect, component information on the components of the coating material corresponding to the search criteria is presented.

As a result, it is possible to provide the user U with the component information corresponding to the search criteria designated by the user U.

In the third aspect of the present embodiment, the information processing apparatus further including a means (for example, the processor 32 executing the step S302) for storing the user ID of the user and the coating material information changed according to the instruction of the user which is associated with each other.

According to the third aspect, the coating material information customized by the user can be managed by the server 30.

In the fourth aspect of the present embodiment, the information processing apparatus further including a means for correcting the tactile sensation information of the identified coating material information according to a user's preference.

In the fifth aspect of the present embodiment, the information processing apparatus further including:

a means (for example, the processor 32 managing the customized information database) for setting access right of the coating material information associated with the first user on the user ID of at least one second user different from the first user; and a means (for example, the processor 32 executing the step S301) for presenting the coating material information for which the access right is set to the second user in response to an instruction from the second user.

According to the fifth aspect, it is possible to provide a certain user with the coating material information changed by another user.

In the sixth aspect of the present embodiment, the information processing apparatus further including a means (for example, the processor 32 executing the step S321) for outputting recipe information on a recipe for generating the coating material corresponding to the identified coating material information.

According to the sixth aspect, the recipe information of the coating material corresponding to the search criteria is output.

As a result, it is possible to provide the user U with recipe information of the coating material corresponding to the search criteria designated by the user U.

A seventh aspect of the present embodiment is the coating material generator 50 connected to the information processing apparatus, the coating material generator 50 including:

a means for acquiring recipe information from the information processing apparatus;

a plurality of cartridges, each cartridge containing raw material of the coating material; and a means for extracting the raw materials contained in the plurality of cartridges based on the recipe information.

According to the seventh aspect, the coating material is generated based on the recipe information of the coating material corresponding to the search criteria.

As a result, it is possible to provide the user U with coating material corresponding to the search criteria designated by the user U.

An eighth aspect of the present embodiment is a computer program for causing a computer (for example, a processor 32) to function as each of the above means.

(7) Other Variations

The memory 11 may be connected to the client apparatus 10 via the network NW.

The memory 31 may be connected to the server 30 via the network NW.

Each step of the above information processing can be executed by either the client apparatus 10 or the server 30.

In the above embodiment, an example in which the texture information is defined by a mathematical formula (for example, Equation 1) is shown, but the mode of texture information is not limited to this.

The texture information may be defined by a data table stored in the memory 31.

In the above embodiment, an example of displaying the coating material information on the display is shown, but the mode of presenting the coating material information is not limited to this.

The coating information can be presented in at least one of the following embodiments:
- computer graphics of the coating material displayed on VR (Virtual Reality);
- computer graphics of the coating material displayed on AR (Augmented Reality); and
- computer graphics of the coating material displayed on MR (Mixed Reality).

Although the embodiments of the present invention have been described in detail above, the scope of the present invention is not limited to the above embodiments.

Further, various modifications and changes can be made to the above embodiments without departing from the spirit of the present invention.

In addition, the above embodiments and variations can be combined.

REFERENCE SIGNS LIST

1: Information processing system
10: Client apparatus
11: Memory
12: Processor
13: Input and output interface
14: Communication interface
30: Server
31: Memory
32: Processor
33: Input and output interface
34: Communication interface
50: Coating material generator

The invention claimed is:

1. An information processing apparatus comprising a processor and a memory, the processor configured to:
   store coating material information on coating material, and tactile sensation information in which the tactile sensation when each coating material is applied to the skin is recorded, the coating material information and the tactile sensation information is associated with each other;
   acquire search criteria for at least one of tactile sensations and textures;
   identify at least one tactile sensation information corresponding to the acquired search criteria; and
   present the coating material information associated with the identified tactile sensation information.

2. The apparatus according to claim 1, wherein
   the coating material information includes component information on a plurality of components of the coating material, and
   the processor presents the component information associated with the identified coating material information.

3. The apparatus according to claim 1, wherein the processor stores the user ID of the user and the coating material information changed according to the instruction of the user which is associated with each other.

4. The apparatus according to claim 1, wherein the processor corrects the tactile sensation information of the identified coating material information according to a user's preference.

5. The apparatus according to claim 3, wherein the processor:
   sets access right of the coating material information associated with first user on the user ID of at least one second user different from the first user; and
   presents the coating material information for which the access right is set to the second user in response to an instruction from the second user.

6. The apparatus according to claim 1, wherein the processor outputs recipe information on a recipe for generating the coating material corresponding to the identified coating material information.

7. A coating material generator connected to an information processing apparatus comprising a processor configured to store coating material information on coating material, and tactile sensation information in which the tactile sensation when each coating material is applied to the skin is recorded, the coating material information and the tactile sensation information is associated with each other, to acquire search criteria for at least one of tactile sensations and textures, to identify at least one tactile sensation information corresponding to the acquired search criteria, to present the coating material information associated with the identified tactile sensation information, and to output recipe information on a recipe for generating the coating material corresponding to the identified coating material information, the generator comprising:
   a plurality of cartridges, each cartridge containing raw material of the coating material; and
   a controller configured to acquire recipe information from the information processing apparatus and to extract the raw materials contained in the plurality of cartridges based on the recipe information.

8. The apparatus according to claim 2, wherein the processor stores the user ID of the user and the coating material information changed according to the instruction of the user which is associated with each other.

9. The apparatus according to claim 8, wherein the processor:
sets access right of the coating material information associated with first user on the user ID of at least one second user different from the first user; and
presents the coating material information for which the access right is set to the second user in response to an instruction from the second user.

10. The apparatus according to claim 2, wherein the processor corrects the tactile sensation information of the identified coating material information according to a user's preference.

11. The apparatus according to claim 2, wherein the processor outputs recipe information on a recipe for generating the coating material corresponding to the identified coating material information.

12. The information processing apparatus according to claim 1, wherein the coating material includes component information on a plurality of components of the coating material, and the processor
presents the component information associated with the identified coating material information,
stores the user ID of the user and the coating material information changed according to the instruction of the user which is associated with each other,
sets access right of the coating material information associated with first user on the user ID of at least one second user different from the first user,
presents the coating material information for which the access right is set to the second user in response to an instruction from the second user,
corrects the tactile sensation information of the identified coating material information according to a user's preference, and
outputs recipe information on a recipe for generating the coating material corresponding to the identified coating material information.

13. A method, comprising:
storing coating material information on coating material, and tactile sensation information in which the tactile sensation when each coating material is applied to the skin is recorded, the coating material information and the tactile sensation information is associated with each other;
acquiring search criteria for at least one of tactile sensations and textures,
identifying at least one tactile sensation information corresponding to the acquired search criteria; and
presenting the coating material information associated with the identified tactile sensation information.

14. The method according to claim 13, wherein
the coating material information includes component information on a plurality of components of the coating material, and further comprising
presenting the component information associated with the identified coating material information.

15. The method according to claim 13, further comprising storing the user ID of the user and the coating material information changed according to the instruction of the user which is associated with each other.

16. The method according to claim 15, further comprising:
setting access right of the coating material information associated with first user on the user ID of at least one second user different from the first user; and
presenting the coating material information for which the access right is set to the second user in response to an instruction from the second user.

17. The method according to claim 13, further comprising correcting the tactile sensation information of the identified coating material information according to a user's preference.

18. The method according to claim 13, further comprising outputting recipe information on a recipe for generating the coating material corresponding to the identified coating material information.

19. The method according to claim 13, wherein the coating material includes component information on a plurality of components of the coating material, and further comprising:
presenting the component information associated with the identified coating material information;
storing the user ID of the user and the coating material information changed according to the instruction of the user which is associated with each other;
setting access right of the coating material information associated with first user on the user ID of at least one second user different from the first user;
presenting the coating material information for which the access right is set to the second user in response to an instruction from the second user;
correcting the tactile sensation information of the identified coating material information according to a user's preference; and
outputting recipe information on a recipe for generating the coating material corresponding to the identified coating material information.

* * * * *